United States Patent [19]

Chu

[11] 3,715,764

[45] Feb. 13, 1973

[54] HIGH POROSITY MANGANESE OXIDE PELLETS

[75] Inventor: Vincent H. K. Chu, Bethlehem, Pa.

[73] Assignee: Bethlehem Steel Corporation, Bethlehem, Pa.

[22] Filed: May 13, 1971

[21] Appl. No.: 143,201

Related U.S. Application Data

[63] Continuation-in-part of Ser. No. 871,599, Nov. 3, 1969, abandoned, which is a continuation of Ser. No. 642,182, May 29, 1967, abandoned.

[52] U.S. Cl. ................................423/49, 252/477 R
[51] Int. Cl. ...........................C01g 45/02, B01j 11/06
[58] Field of Search .....23/145; 75/80, 161; 252/189, 252/190, 191, 471, 477 R; 423/49

[56] References Cited

UNITED STATES PATENTS

| | | | |
|---|---|---|---|
| 2,370,415 | 2/1945 | Pine | 23/145 |
| 3,145,183 | 8/1964 | Fisher | 252/477 R |
| 1,109,448 | 9/1914 | Messerschmitt | 252/191 |
| 2,950,231 | 8/1960 | Batchelor et al. | 252/189 |
| 2,848,318 | 8/1958 | Tardieu | 75/80 |
| 3,397,257 | 8/1968 | Bramhilla et al. | 23/145 |

*Primary Examiner*—Oscar R. Vertiz
*Assistant Examiner*—Hoke S. Miller
*Attorney*—Joseph J. O'Keeffe

[57] ABSTRACT

Porous manganese oxide pellets in which a major portion of the manganese oxides is manganous oxide and the porosity of the pellets is not less than about 45%. Preferably, substantially all the manganese oxide in the pellets is manganous oxide and the porosity is about 60 percent. The porous manganese oxide pellets are between about one-fourth inch to about five-eighths inch in diameter. The pellets are useful as sulfur acceptors whereby they can be used to reduce the sulfur content of other materials such as coke pellets, iron ore pellets and the like.

4 Claims, No Drawings

HIGH POROSITY MANGANESE OXIDE PELLETS

CROSS-REFERENCES TO RELATED APPLICATIONS

This is a continuation-in-part application of my application Ser. No. 871,599, filed Nov. 3, 1969, entitled "High Porosity Manganese Oxide Pellets and the Method of Manufacturing Same," now abandoned which is a continuation of my application Ser. No. 642,182, filed May 29, 1967, entitled "High Porosity Manganese Oxide Pellets and Method of Manufacturing Same," now abandoned.

BACKGROUND OF THE INVENTION

It is known in the art that manganous oxide is an excellent acceptor of sulfur and may be used to remove sulfur from solid sulfur-containing materials, for example carbonaceous fuels such as coke pellets. The manganous oxide sulfur acceptor is made from high purity manganic oxide ores such as pyrolusite, Ramsdellite and the like. Most of these ores are not readily accessible and generally must be briquetted, calcined, and crushed to a fine particle size prior to their use. Ramsdellite may, however, because of its inherent strength be calcined without briquetting after crushing the ore to a fine particle size. See U. S. Pat. No. 2,950,231. Because of their fine particle size, these ores require special techniques in material handling.

The primary object of this invention is to provide a porous manganese oxide pellet which can be used as an acceptor for sulfur to thereby reduce the sulfur content of solid sulfur-containing materials such as coke pellets and iron ore pellets.

An object of this invention is to provide a porous manganese oxide pellet in which the major portion of the manganese oxide is manganous oxide and the porosity is at least about 45 percent.

Another object of this invention is to provide a porous manganese oxide pellet in which substantially all the manganese oxide is manganous oxide and the porosity is at least about 60 percent.

Another object of this invention is to provide a porous manganese oxide pellet which retains sufficient strength to resist degradation during handling.

SUMMARY OF THE INVENTION

The invention in its broadest aspect includes mixing a suitable amount of a carbonaceous-bearing reducing agent for example anthracite coal, bituminous coal, coke, petroleum coke, or coke breeze, a finely divided manganese ore or concentrate and a sufficient amount of a suitable addition agent, for example an alkaline metal salt of carboxyl methylcellulose, balling the mixture and heating the balls at elevated temperatures to cause the carbonaceous-bearing material to partially reduce the manganese ore. During heating, gaseous products, for example carbon dioxide, are evolved. During this step, the addition agents breaks down also, forming gaseous products, for example carbon dioxide. The gaseous products escaping from the interior of the pellets form voids or pores in the pellets.

DESCRIPTION OF THE PREFERRED EMBODIMENTS

In a more detailed description of the invention, it has been found that oxidic and carbonate manganese ores may be processed into pellets which may be used as sulfur acceptors to remove a portion of the sulfur from solid, sulfur-containing materials such as coke pellets or metallized iron ore pellets. In order to ball and pelletize the manganese ores, the raw materials described above must be crushed to a suitable size, for example, such that 65 percent of the particles will pass a 325 mesh Tyler Sieve Size. Typical ores or concentrates which may be used in the process may have the following chemical compositions:

| Mn (%) | $CO_2$ (%) | Fe % | $SiO_2$ (%) | $Al_2O_3$ (%) | CaO (%) | MgO (%) | C (%) |
|---|---|---|---|---|---|---|---|
| 55.3 | | 1.30 | 4.45 | 2.28 | | | |
| 50.4 | | 4.20 | 4.60 | 5.30 | 0.39 | 0.33 | 0.36 |
| 31.5 | 35.7 | 5.48 | 3.90 | 1.60 | 14.8 | 2.80 | 0.45 |
| 40.0 | | 6.20 | 10.00 | 5.00 | 6.00 | 5.00 | | the remainder being incidental impurities such as $Na_2O$, $K_2O$, $P_2O_5$, $FeS_2$, Ti and As. If desired the ores are concentrated in the conventional manner such as by fatty acid flotation, heavy media concentration, etc. The ores are mixed with at least one carbonaceous material such as anthracite coal, bituminous coal, coke, coke breeze, or petroleum coke, which has been ground to a suitable size for pelletizing, for example -200 mesh Tyler Sieve Size, and an addition agent which will decompose during subsequent heating to form gaseous products such as Co or $CO_2$, for example an alkaline metal salt of carboxyl methylcellulose. The mixture is formed into balls. The balls can be as large as 1½ inches and as small as one-eighth inch in diameter. It is preferred to make the balls about three-eighth inch to three-fourth inch in diameter. It may be desirable to add a small amount of a binder such as bentonite to the mixture, for example between about 5 pounds and about 20 pounds per ton of ore to give the balls green strength. The green balls which are defined as balls formed of the above described materials prior to heating, are heated at a temperature and for a time sufficient to produce relatively hard pellets. The pellets are green balls heated to a temperature to cause the green balls to harden and to cause the particles of the materials to form a cohesive nodule-like product. During the heating step the carbonaceous material reacts with the manganese ore to partially reduce the ore to manganous.manganite ($MnO.Mn_2O_3$). Some manganous ferrite ($MnO.Fe_2O_3$) may be formed if the ore contains sufficient iron. Gaseous products, primarily carbon dioxide, are formed in the reaction. The carboxyl methylcellulose salt also breaks down to form gaseous products such as carbon dioxide. The gaseous products, in escaping from the interior outwardly to the surface of the green balls during firing, form minute passages or pores therein. The pellets so produced develop a porosity of not less than about 45 percent during the heating step and shrink to a diameter of about one-fourth inch to five-eighth inch. Not less than 30 percent of the manganese compounds in the pellets is in the form of manganous oxide or manganous manganite.

It has also been found that by subjecting the original pellets to a second heating step, in the presence of a reducing gas, the unreduced portion of the manganese oxide in the pellets can be reduced to manganous oxide. The pellets thereafter contain substantially all manganous oxide (MnO), and have a porosity of not less than about 60 percent. Of course, the amount of porosity cannot be so high that the pellets disintegrate and become powder. It has been found that for practical purposes the porosity should not exceed about 70 percent. The pellets can be used as sulfur acceptors to remove a portion of the sulfur in solid, sulfur-containing materials such as coke pellets, or iron ore pellets in a process wherein the solid, sulfur-containing materials are mixed with the manganous oxide pellets. The mixture is heated to a suitable temperature, for example, between about 1,100° F. to about 1,650° F. and a hydrogen bearing gas is passed through the mixture. The hydrogen acts as a transport to pass the sulfur from the sulfur-containing materials to the manganous oxide pellets.

The amount of carbonaceous material required to partially reduce the manganese ore in the pellets and to assist in forming pores therein in the initial heating step can vary over a wide range, for example, from about 600 pounds to about 1,000 pounds of carbonaceous material per ton of manganese ore with 800 pounds a preferred amount. Too large an amount of carbonaceous material added to the ore will result in the pellets becoming too hard and fusing together to form clinkers. Too little carbonaceous material added to the manganese ore will result in insufficient reduction of the ore and insufficient porosity.

The amount of decomposable addition agent which should be added may be between about 9 pounds and about 13.5 pounds per ton of manganese ore.

The porosity of the pellets is determined by the following formula:

$$\text{Porosity} = \frac{\text{true density} - \text{apparent density}}{\text{true density}} \times 100$$

where the apparent density is obtained by the well known mercury method and the true density is determined by the standard air pycnometer method.

In an example of the invention a synthetic ore mixture of the following analysis was used:

| Mn(%) | Fe(%) | SiO$_2$(%) | Al$_2$O$_3$(%) | CaO(%) | MgO(%) |
|---|---|---|---|---|---|
| 33.56 | 7.37 | 13.58 | 6.62 | 6.10 | 5.18 | a balling mix was then made having the following composition:

| | |
|---|---|
| Synthetic ore mix (65% −325 Mesh Tyler Sieve Size) | 2000 parts |
| Anthracite coal (−200 Mesh Tyler Sieve Size) | 800 parts |
| Sodium Salt of Carboxyl Methylcellulose | 12 parts |
| Bentonite | 10 parts |

The mix was balled in the conventional manner to form balls between one-half inch in diameter and 1 inch in diameter.

Separate portions of the balls were fired in a muffle furnace in the presence of air under varying conditions as follows:

| Test No. | Bed Depth (Inches) | Heating Temperature (°F.) | Heating Time |
|---|---|---|---|
| 1 | 1 | 2300 | 15 to 20 minutes |
| 2 | 1 | 2200 | 40 minutes |
| 3 | 1 | 2000 | 60 minutes |
| 4 | 4 | 2100 | 5 hours |

All the fired pellets developed a porosity of 52.4 percent or more. The major mineralogical constituent of the pellets was manganous ferrite (MnO.Fe$_2$O$_3$) with the minor constituent being (MnO.SiO$_2$).

A portion of the fired pellets was then activated by heating the pellets to within the temperature range of 1,600° F.– 1,650° F. for from 20 to 30 minutes while carbon monoxide was passed through the bed. All of the pellets were found to have a porosity of about 63.1 percent with the major mineralogical constituent now being manganous oxide (MnO). The pellets were between one-fourth inch to one-half inch in diameter.

A mixture of metallized iron ore pellets and the activated manganous oxide pellets was heated at 1,650° F. for 1 hour in the presence of hydrogen gas. The sulfur content of the metallized iron ore pellets was reduced from 0.65 percent to 0.28 percent and the sulfur content of the manganous oxide pellets was increased from 0.004 percent to 0.305 percent.

In another specific example of the invention a mix of the following composition was made:

| | |
|---|---|
| Amapa ore (65% −325 mesh) (Mn content 31.5%) | 2000 parts |
| Anthracite (−200 mesh) | 800 parts |
| Sodium Salt of Carboxyl Methylcellulose | 12 parts |
| Bentonite | 10 parts |

The mix was formed into balls about one-half inch to three-fourth inch in diameter in the conventional manner. Separate portions of the balls were heated in the presence of air under the following conditions:

| Test No. | Bed Depth (Inches) | Heating Temperature (°F.) | Heating Time (Hours) |
|---|---|---|---|
| 1 | ½ | 1960 | 3½ |
| 2 | ½ | 2160 | 2 |
| 3 | 1½ | 2050 | 7 |
| 4 (heated Twice) | 4 | 1960 | 20 (1st cycle) |
| | | 2100 | 8 (2nd cycle) |

The pellets had a porosity of not less then 51.4 percent and the major constituent as determined by X-ray identification was manganous manganite (MnO.Mn$_2$O$_3$).

The pellets were then activated by heating at 1,600° F. for 30 minutes in the presence of CO gas. The porosity of the pellets was found to be not less than 66.5 percent and the major constituent as determined by X-ray identification was found to be manganous oxide (MnO). The pellets were between about one-fourth inch to about five-eighth inch in diameter.

A mixture of metallized iron ore pellets and the activated manganous oxide pellets was made. The bed of the mixed pellets was heated at 1,650° F. for 1 hour in the presence of hydrogen gas passed therethrough. The sulfur content of the metallized iron ore pellets was reduced from 0.35 to 0.15 percent while the sulfur content of the manganous oxide pellets was increased from 0.005 to 0.13 percent.

It has been suggested that the manganese oxide pellets of the invention may be used as charge material in the production of ferromanganese alloys.

In this specification, wherever percentages are referred to, such percentages are by weight except as otherwise indicated.

I claim:

1. A porous manganese oxide pellet about one-fourth inch to about five-eighth inch in diameter in which not less than 30 percent of the manganese oxide is manganous oxide and characterized by having a porosity of not less than 45 percent and not more then 70 percent.

2. A porous manganese oxide pellet about one-fourth inch to about five-eighth inch in diameter treated at a temperature for a time to reduce the manganese oxide to manganous oxide and characterized by having a porosity of not less than 60 percent and about 70 percent.

3. A porous manganese oxide pellet according to claim 1 wherein the porosity of the pellet is between about 45 and 50 percent.

4. A porous manganese oxide pellet according to claim 2 wherein the porosity of the pellet is between about 60 and 70 percent.

* * * * *